United States Patent
Kloeppel et al.

(10) Patent No.: US 11,766,041 B2
(45) Date of Patent: Sep. 26, 2023

(54) FOOD CONTACT DISINFECTING/SANITIZING FORMULATION AND WIPE

(71) Applicant: Arxada, LLC, Morristown, NJ (US)

(72) Inventors: Andrew Kloeppel, Harrington Park, NJ (US); David Koehl, Bethlehem, PA (US); Andrew Colurciello, Newburgh, NY (US)

(73) Assignee: Arxada, LLC, Morristown, NJ (US)

( * ) Notice: Subject to any disclaimer, the term of this patent is extended or adjusted under 35 U.S.C. 154(b) by 446 days.

(21) Appl. No.: 14/107,555

(22) Filed: Dec. 16, 2013

(65) Prior Publication Data

US 2014/0171512 A1 Jun. 19, 2014

Related U.S. Application Data

(60) Provisional application No. 61/738,502, filed on Dec. 18, 2012.

(51) Int. Cl.
*A01N 33/12* (2006.01)
*A01N 47/44* (2006.01)

(52) U.S. Cl.
CPC ............. *A01N 33/12* (2013.01); *A01N 47/44* (2013.01)

(58) Field of Classification Search
CPC .................................. A01N 33/12; A01N 47/44
See application file for complete search history.

(56) References Cited

U.S. PATENT DOCUMENTS

| | | | |
|---|---|---|---|
| 5,000,867 A * | 3/1991 | Heinhuis-Walther | A01N 47/44 510/384 |
| 5,529,713 A | 6/1996 | Gauthier-Fournier | |
| 6,939,840 B2 | 9/2005 | Lichtenberg et al. | |
| 7,345,015 B1 | 3/2008 | Kong et al. | |
| 2005/0054257 A1* | 3/2005 | Barnabas | A47L 13/20 442/408 |
| 2010/0240762 A1 | 9/2010 | McGeechan et al. | |
| 2012/0157540 A1 | 6/2012 | McGeechan et al. | |
| 2014/0294749 A1* | 10/2014 | Gentle | D06M 13/463 424/76.8 |

FOREIGN PATENT DOCUMENTS

CA  2590507 A1 * 11/2008  ............. A01N 33/12

\* cited by examiner

*Primary Examiner* — Aradhana Sasan
(74) *Attorney, Agent, or Firm* — Dority & Manning, P.A.

(57) ABSTRACT

Disclosed is a sanitizing/disinfecting composition containing a quaternary ammonium compound and a polybiguanide. The composition is a food contact safe composition which does not need rinsing after being applied to a substrate. The composition may be saturated into a wipe.

19 Claims, No Drawings

FOOD CONTACT DISINFECTING/SANITIZING FORMULATION AND WIPE

CROSS REFERENCE TO RELATED-APPLICATION

This application claims priority under 35 U.S.C. § 119(e) from U.S. Ser. No. 61/738,502 filed Dec. 18, 2012. The disclosure of U.S. Ser. No. 61/738,502 is incorporated herein by reference in its entirety.

FIELD OF THE INVENTION

The present invention relates to disinfecting/sanitizing formulation and wipes containing the formulation. More specifically, the present invention relates to a disinfecting/sanitizing formulation and wipes saturated with the formulation where formulation comprises a unique combination of active ingredients.

BACKGROUND OF THE INVENTION

Disinfecting/sanitizing of surfaces is presently obtained by one or more of the following products: 1) a disinfectant wipe; 2) a food contact sanitizing wipe; 3) a concentrated liquid disinfectant; 4) a concentrated liquid food contact sanitizer; 5) a Ready To Use (RTU) liquid disinfectant; 6) an RTU liquid food contact sanitizer; and/or 7) an RTU cleaner (non-antibacterial), which may include glass cleaners. Drawbacks related to each of the solutions include elements such as those set forth below.

Current disinfectant wipes generally require that the surface stay wet for at least ten minutes to achieve disinfection. Current wipes also require a potable water rinse after use on food contact surfaces. This is because the levels of active ingredients needed to achieve disinfection exceed the allowable food tolerance levels, and hence make it necessary to include a potable water rinse step in order to remove residues of the product from the surface before it comes in contact with food. Essentially, the levels of ingredients found in the residues of these products, after applied to a surface to be disinfected, are considered unsafe for human consumption and must be removed from the surface before food items can be placed on them.

In addition, current food contact sanitizing wipes require a pre-clean step to remove visible organic soils prior to using the wipe to sanitize the surface, and will achieve at most a $5_{Log10}$ reduction (destroying 99.999% of specified pathogenic organisms) rather than complete disinfection (destroying all).

When using a concentrated liquid disinfectant, a dilution of the concentrate must first be made. Then, the dilution is applied to the surface with sponge, rag, or mop, and the surface left wet for at least ten minutes to achieve disinfection. A potable water rinse is required after use on food contact surfaces. This is especially true if the dilution was to a level that the active ingredients are higher than the recommended use.

The same is true when using a concentrated Food Contact Sanitizer, but the dilution is made at a lower resulting concentration to assure allowable food tolerance levels. A potable water rinse is not required; however the resulting level of antibacterial efficacy, or "kill", on the surface is lower, destroying 99.999% of the pathogenic organisms ($5_{Log10}$ reduction).

With a Ready to Use (RTU) liquid disinfectant, a potable water rinse step is necessary in order to remove residues of the product from the surface before it comes in contact with food. Generally, disposable paper towels are used to wipe, but sometimes sponges or rags are used and reused which over time can lead to the build-up and rapid spread of pathogenic organisms. Disinfectants are effective on hard surfaces only, and will not generally "kill" or prevent the growth of pathogenic organisms on soft surfaces such a cloth or sponges.

With an RTU liquid food contact sanitizer a pre-clean step is generally required, and the resulting level of antibacterial efficacy, or "kill", on the surface is at most a $5_{Log10}$ reduction (destroying 99.999% of specified pathogenic organisms) rather than complete disinfection (destroying all). Generally, disposable paper towels are used to wipe, but sometimes sponges or rags are used and reused which over time can lead to the build-up and rapid spread of pathogenic organisms.

An RTU cleaner (non-antibacterial) is generally sprayed on the surface then wiped clean. They may clean visible soils, but will leave pathogenic organisms behind. If rags or sponges are used, pathogen build-up can occur hear which will subsequently lead to their rapid spread.

There is therefore a need for a higher level of microbiological efficacy, or "kill", than what is currently offered among commercially available wipes products at this time for use on food contact surfaces for the consumer, healthcare, and food service markets. The higher level of efficacy is disinfection, which in current US Regulatory terms refers to a complete destruction of all specified test organisms in ten minutes under conditions of the appropriate AOAC (Association of Official Analytics Chemists) test method used. This is a higher level of efficacy than what is achieved with sanitization which, again in current US Regulatory terms, refers to the destruction of 99.999% ($5_{Log10}$ reduction) of specified test bacteria in 30 seconds under conditions of the appropriate official test method used.

There is a further need for a ready to used (RTU) formulation and/or wipe providing a higher level of microbiological efficacy that does not require a potable water rinse after use on food contact surfaces.

SUMMARY OF THE INVENTION

The present invention provides a formulation or composition enabling a higher level of microbiological efficacy that does not require a pre-clean step to remove visible organic soils and does not require a potable water rinse after use on food contact surfaces. Because of a unique combination of active ingredients, the invention is able to achieve disinfection at active levels that previously have not been demonstrated in prior art.

The sanitizing/disinfecting formulation or composition of the present invention contains a quaternary ammonium compound having the general formula:

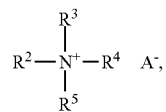

wherein
$R^2$ is benzyl or $C_{6-18}$-alkyl;
$R^3$ is $C_{1-18}$-alkyl or $-[(CH_2)_2-O]_n R^6$ where n=1-20;

R[4] and R[5] independently of one another are $C_{1-4}$-alkyl;
R[6] is hydrogen or unsubstituted or substituted phenyl; and
A[−] is a monovalent anion or one equivalent of a polyvalent anion of an inorganic or organic acid; and
a polybiguanide.

The quaternary ammonium compound is present in an effective amount up to about 400 ppm and the polybiguanide is present in an amount up to about 550 ppm.

The present invention also provides a wipe saturated with the formulation or composition. The wipe is used to apply the composition to a substrate in need of treatment with the composition.

The present invention also provides a method of sanitizing or disinfecting a substrate by contacting a substrate with the composition of the present invention and allowing the composition to dry on the substrate.

For a better understanding of the invention, its operating advantages and the specific objects attained by its uses, reference should be had to the accompanying drawings and descriptive matter which illustrate preferred embodiments of the invention.

DETAILED DESCRIPTION OF THE INVENTION

Generally stated, the present invention provides a food safe disinfecting/sanitizing formulation that does not require portable water to rinse the composition from a surface in which the formulation is applied. The formulation of the present invention is provided as a ready-to-use composition which can be applied to a substrate to be treated using known application means. In one particular embodiment, the formulation is saturated into a wipe, and the wipe is used to apply the formulation to a surface to be treated with the formulation. The advantage of the wipe is the wipe is disposable after use and will not be reused to apply the formulation to more than one surface area.

The present invention provides a sanitizing/disinfecting composition containing a quaternary ammonium compound and a polybiguanide. The quaternary ammonium compound having the general formula (I):

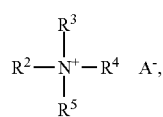
(I)

wherein
R[2] is benzyl or $C_{6-18}$-alkyl;
R[3] is $C_{1-18}$-alkyl or —[(CH$_2$)$_2$—O]$_n$R[6] where n=1-20;
R[4] and R[5] independently of one another are $C_{1-4}$-alkyl;
R[6] is hydrogen or unsubstituted or substituted phenyl; and
A[−] is a monovalent anion or one equivalent of a polyvalent anion of an inorganic or organic acid.

Alkyl, here and hereinafter, is taken to mean in each case unbranched or branched alkyl groups of the specified number of carbons, but preferably unbranched alkyl groups, and particularly preferably those having an even number of carbon atoms. In particular, this is also taken to mean the homologue mixtures derived from natural raw materials, for example "cocoalkyl".

Substituted phenyl is taken to mean, in particular, phenyl groups substituted with one or more $C_{1-18}$-alkyl groups and/or halogen atoms. Suitable anions A[−] are in principle all inorganic or organic anions, in particular halides, for example chloride or bromide, carbonates, bicarbonates, carboxylates, sulfonates, phosphates or a mixture thereof. Carboxylates may be derived from lower carboxylic acids or from fatty acids.

Exemplary quaternary ammonium compounds having general formula (I) include compounds such as, for example, didecyldimethyl ammonium salt, alkyldimethylbenzyl ammonium salt, dioctyldimethyl ammonium salt, octyldecyldimethyl ammonium salt, dicocoalkyldimethyl ammonium salt, cocoalkyldimethylpoly(oxyethyl) ammonium salt, dicocoalkylmethyl-poly(oxyethyl) ammonium salt, decyldimethylpoly(oxyethyl) ammonium salt, didecylmethylpoly(oxyethyl) ammonium salt, octyidimethylpoly(oxyethyl) ammonium salt, dioctylmethylpoly(oxyethyl) ammonium salt, cocoalkytdimethylbenzylammonium salt, benzyldodecyidimethylammonium salt or benzyldimethylpoly(oxyethyl) ammonium salt. Specific examples of alkyldimethylbenzyl quaternary ammonium compounds for use in the present invention include mixed alkyl ($C_{14}$ 50%, $C_{12}$ 40%, $C_{16}$ 10%) dimethylbenzyl ammonium chloride and mixed alkyl ($C_{14}$ 60%, C16 30%, $C_{12}$ 5%, $C_{18}$ 5%) dimethylbenzyl ammonium chloride. In is also noted that mixture of two or more of the quaternary ammonium compounds may be used in the formulation. Many of these quaternary ammonium compounds are available from Lonza America, Inc., having offices in Allendale, N.J.

Generally, any polybiguanide may be used. Suitable polybiguanides include, for example, polyalkylene biguanides. One commercially available polyalkylene biguanide which is useable in the present invention is polyhexamethylene biguanide [also known as poly(iminoimidocarbonyliminoimidocarbonyliminohexamethylene) hydrochloride, or PHMB]. One particular useable PHMB is Vantocil P available from Arch Chemicals, Inc., having an office in Atlanta, Ga.

In the present composition, in order to be a food safe composition, the total amount of the quaternary ammonium compound and the polybiguinide is limited by guidelines. In order to be considered food safe, the amount of the quaternary ammonium compound of formula (I) should be present in an effective amount up to about 400 ppm of the composition. In addition, polybiguanide is present in the composition in an effective amount up to 550 ppm. It is noted that the amount of the quaternary ammonium compound and the polybiguanide may be above the levels mentioned above, without departing from the scope of the present invention. However, to be food-surface contact safe, the amounts of each active ingredient must be at or below the limits set forth above. In addition, the fluid expressed from wipes may not exceed these levels in order to be considered food safe. Generally, the lower limits are minimal amounts to be effective and may be as low as 10 ppm, more particularly as low as about 50 ppm.

The formulation of the present invention has a relative low amount of the active ingredients. The formulation generally contains water as a solvent. Water is generally purified water, including distilled water or deionized water. In addition to water, other solvents may be used, including organic solvents such as lower alcohols. Exemplary lower alcohols include ethanol, and isopropyl alcohol. The limit to the amount of organic solvent used is dependent on the formulations final use. In consumer applications, the amount of the organic solvent may be limited by regulation. For example, in California the VOC content must be less than about 0.5%. In institutional application or other non-consumer or professional applications, or for compositions outside California, the VOC content may exceed 0.5%. It is noted that the addition of a volatile solvent aids in increasing the rate of evaporation of the formulation from the substrate to which it is applied. Therefore, the amount of the organic solvent may be varied to achieve the desired drying time.

The formulation may further contain additional ingredients, including surfactants, chelators, builder salts, dyes, fragrances and the like component that are commonly used in the art in cleaning and disinfecting solutions. Suitable surfactants include, but are not limited to, non-ionic surfactants, for example, amine oxides, linear alcohol ethoxylates, secondary alcohol ethoxylates, ethoxylate esters, betamines, polyoxyalkylene polymers and copolymers and alkyl polyglycerides. The surfactants may be present in the final formulation ranges from 0.001 wt. % to 10 wt. %, and more typically in the range being 0.01 to 5 wt. %. Examples of chelators that may be used are sodium and potassium salts of ethylenediaminetetraacetic acid (EDTA), citric acid, nitriloacetic acid, and various phosphoric acids and zeolites. Chelators serve to remove hardness from the water uses as the solvent. The percentage, by weight, of chelators that may be used in the final formulation ranges from 0.001 wt. % to 10 wt. %, and more typically in the range being 0.01 to 5 wt. %. Examples of building salts that may be used include sodium metasilicate, sodium tripolyphosphate, sodium nitrilotriacetate, sodium carbonate, sodium silicate, citric acid salts and zeolites. The percentage, by weight, of building salts that may be used in the final formulation ranges from 0.001 to 15 wt. %, with the preferred range being 0.01 to 0.5 wt. %. Other ingredients added to the composition in amounts conventionally used in sanitizing and disinfecting compositions.

The formulation of the present invention may be applied to a substrate to be treated using conventional application techniques. Conventional techniques include spraying, pouring, squirting and/or wiping the formulation on a substrate. The composition is provided to the end user as a ready-to-use formulation or is provided to the end user in a container with an application means. For example, the composition may be provided in a container which is pressurized as an aerosol, a container with a trigger or pump sprayer, as a squirt container or conventional containers with a removable cap that allows the user to pour the formulation onto a substrate.

However, one particularly useful application means is to impregnate the formulation into a wiper substrate. In this embodiment, the wipe is a single use wipe that is impregnated with the formulation and is stored in a container that will dispense the wipe to a user. The container with the wipes may contain a single wipe, or several wipes. Suitable containers include a pouch containing a single wipe, such as a moist towelette which is torn open by the user, or may be a pouch with a resealable opening containing several wipes in a stacked fashion or other suitable formation that would allow a single wipe to be removed from the opening at a time. Pouches are generally prepared form a fluid impervious material, such as a film, a coated paper or foil or other similar fluid impervious materials. In another way to dispense wipes of the present invention is to place the wipe in to a fluid impervious container having an opening to access the wipes in the container. Containers may be molded plastic container with lids that are fluid impervious. Generally, the lid will have an opening to access the wipes in the container. The wipe in the container may in a interleaved stacked, such that as a wipe is removed from the container the next wipe is positioned in the opening of the container ready for the user to remove the next wipe. Alternatively, the wipe may be a continuous material which is perforated between the individual wipes of the continuous material. The continuous wipe material with perforations may be in a folded form or may be in a rolled form. Generally, in the rolled form, the wipe material is feed from the center of the rolled material. As with the interleaved stack, as a wipe is removed from the container, the next wipe is positioned in the opening for the use to remove the next wipe, when needed.

Disposable wipes provide advantages over other application vehicles, such as a reusable sponge, rag or the like. Unlike sponges, rags and the like, which are used repeatedly, the impregnated wipe is used a single time and disposed of. As is mentioned above, reused sponge or rag presents problems since the sponge or rags may carry microbes that are not easily killed by the formulation. Further, formulation is formulated to treat hard surface, not porous soft surfaces that are present in sponges or rags.

The formulation is impregnated into the wipe such that the wipe is pre-moistened and will express or release the formulation on to the substrate as the wipe is run across the substrate to be treated. Generally, the formulation is saturated into the wipe such that the wipe will release the formulation to the substrate through the wiping action.

Suitable wipe substrates include woven and nonwoven materials. Essentially any nonwoven web material may be used. Exemplary nonwoven materials may include, but are not limited to meltblown, coform, spunbond, airlaid, hydroentangled nonwovens, spunlace, bonded carded webs, and laminates thereof. The fibers used to prepare the wipe substrate may be cellulosic fiber, thermoplastic fibers and mixtures thereof. The fibers may also be continuous fibers, discontinuous fibers, staple fibers and mixtures thereof. Basis weights of the nonwoven web may vary from about 12 grams per square meter to 200 grams per square meter or more.

The pre-moistened towelette (wipe) is disclosed herein. In one embodiment the wipe is impregnated with a liquid component containing both active and inert ingredients that are approved for use on food contact surfaces and are within the allowable food tolerance levels and the formulation expressed from the wipe contains active ingredients within the allowable food tolerance levels. Once applied to the surface, the antimicrobial formulation is allowed to remain on the surface for a period of time. The antimicrobial composition may be applied to the surface and allowed to dry or may alternatively be dried by wiping the surface with a dry wipe or wiping device, which is preferably unused.

When the wipe or formulation of the present invention is used to wipe a food contact surface, disinfection is achieved in five minutes or less. When the wipe of the present invention is used to wipe a food contact surface, sanitization is achieved in 30 seconds or less.

The examples below illustrate the implementation of the invention, and should not be taken to be a restriction to the embodiments described. All quantities given, where not otherwise specified, are in % by mass.

EXAMPLES

The following formulations were prepared and then saturated into wipes. The wipe substrate is spunlace polyester having a basis weight of 45 gram per square meter. Six exemplary formulations are provided herein and are shown in the Tables 1-4. In each example, the wipe contained 5:1 liquid weight to wipe substrate weight ratio is used to impregnate the substrate material. Substrate material is Suominen (formally Ahlstrom) SX-145, 100% polyester wipe substrates without binder, 45 gsm, non-apertured spunlace material.

Example 1

TABLE 1

| Ingredients | % by Weight |
|---|---|
| Deionized water | 82.297 |
| Tetrasodium Ethylenediaminetetraacetate (Na$_4$ EDTA), 39% | 0.018 |
| Linear Primary Alcohol Ethoxylate, Tomadol ® 91-6, 100% | 0.010 |
| DDAC/ADBAC quat blend, Bardac ® 208M, 80% | 0.047 |
| DDABC quat, Carboquat ™ H, 50% | — |
| ADBAC quat, Barquat ® MB-80, 80% | — |
| Ethanol, SDA 3A 200, >95% | 0.750 |
| Polyhexamethylene Biguanidine (PHMB), Vantocil ™ P, 20% | 0.208 |
| Suominen (formally Ahlstrom) SX-145, 100% polyester wipe substrate | 16.670 |
| Total | 100.000 |

Example 2

TABLE 2

| Ingredients | % by Weight |
|---|---|
| Deionized water | 82.268 |
| Tetrasodium Ethylenediaminetetraacetate (Na$_4$ EDTA), 39% | 0.018 |
| Linear Primary Alcohol Ethoxylate, Tomadol ® 91-6, 100% | 0.010 |
| DDAC/ADBAC quat blend, Bardac ® 208M, 80% | — |
| DDABC quat, Carboquat ™ H, 50% | 0.076 |
| ADBAC quat, Barquat ® MB-80, 80% | — |
| Ethanol, SDA 3A 200, >95% | 0.750 |
| Polyhexamethylene Biguanidine (PHMB), Vantocil ™ P, 20% | 0.208 |
| Suominen (formally Ahlstrom) SX-145, 100% polyester wipe substrate | 16.670 |
| Total | 100.000 |

Example 3

TABLE 3

| Ingredients | % by Weight |
|---|---|
| Deionized water | 82.281 |
| Tetrasodium Ethylenediaminetetraacetate (Na$_4$ EDTA), 39% | 0.018 |
| Linear Primary Alcohol Ethoxylate, Tomadol ® 91-6, 100% | 0.010 |
| DDAC/ADBAC quat blend, Bardac ® 208M, 80% | — |
| DDABC quat, Carboquat ™ H, 50% | 0.045 |
| ADBAC quat, Barquat ® MB-80, 80% | 0.018 |
| Ethanol, SDA 3A 200, >95% | 0.750 |
| Polyhexamethylene Biguanidine (PHMB), Vantocil ™ P, 20% | 0.208 |
| Suominen (formally Ahlstrom) SX-145, 100% polyester wipe substrate | 16.670 |
| Total | 100.000 |

The formulations of Examples 1-3 above have each demonstrated disinfection against *Salmonella enterica*, a gram negative bacteria, as well as *Staph. aureus*. All three formulations 1-3 have demonstrated disinfection against *Staph. aureus*. All tests were conducted using test method for Pre-Saturated Towelette for Hard-Surface Disinfection (Modified AOAC 961.02, AOAC Germicidal Spray Products as Disinfectants). Additional micro testing is currently being conducted to demonstrate disinfection against other relevant challenge organisms (bacteria and viruses).

Example 4

TABLE 4

| Ingredients: | Formula 4a % by Wt. | Formula 4b % by Wt. | Formula 4c % by Wt. |
|---|---|---|---|
| Deionized water | 82.556 | 80.448 | 80.498 |
| Alkyl Polyglucoside (APG), C8-C10, Glucopon 215 UP, 63% | 0.133 | 0.133 | — |
| EO-PO Block Copolymer, Pluronic L64, 100% | — | — | 0.083 |
| DDABC quat, Carboquat H, 50% | 0.060 | 0.060 | 0.060 |
| Isopropyl Alcohol, 99.5% | 0.392 | 2.500 | 2.500 |
| Polyhexamethylene Biguanide (PHMB), Vantocil P, 20% | 0.189 | 0.189 | 0.189 |
| Suominen (formally Ahlstrom) SX-145, 100% polyester wipe substrate | 16.670 | 16.670 | 16.670 |
| Total: | 100.000 | 100.000 | 100.000 |

Each of formulations 4a, 4b and 4c were developed in order to meet a need for low-residue/streaking characteristics on surfaces after use of the wipe. Alkyl polyglucosides (APGs) are class of non-ionic surfactants which impart a non-streaking/non-filming benefits when used in cleaning formulations intended for use on glossy hard surfaces. Pluronic L64, EO-PO block copolymer, is another class of non-ionic surfactants that has low residue/streaking benefits. Formulation 4a demonstrated disinfection vs. *Staphylococcus aureus* and *Pseudomonas aeruginosa*, at 5-minute contact time, and 5% Fetal Bovine Serum present; using the test method for Pre-Saturated Towelette for Hard-Surface Disinfection (Modified AOAC 961.02, AOAC Germicidal Spray Products as Disinfectants). Example 4b: demonstrated disinfection vs. *Staphylococcus aureus, Salmonella enterica*, and *Pseudomonas aeruginosa*, at 5-minute contact time, and 5% Fetal Bovine Serum present, using the test method for Pre-Saturated Towelette for Hard-Surface Disinfection (Modified AOAC 961.02, AOAC Germicidal Spray Products as Disinfectants). In addition, Example 4c: demonstrated disinfection against *Staphylococcus aureus* and *Salmonella enterica*, at 5-minute contact time, and 5% Fetal Bovine Serum present; using the test method for Pre-Saturated Towelette for Hard-Surface Disinfection (Modified AOAC 961.02, AOAC Germicidal Spray Products as Disinfectants).

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention and any equivalent thereto. It can be appreciated that variations to the present invention would be readily apparent to those skilled in the art, and the present invention is intended to include those alternatives. Further, since numerous modifications will readily occur to those skilled in the art, it is not desired to limit the invention to the exact construction and operation illustrated and described, and accordingly, all suitable modifications and equivalents may be resorted to, falling within the scope of the invention.

What is claimed is:

1. A sanitizing/disinfecting composition comprising:
  a) a quaternary ammonium compound, having the general formula:

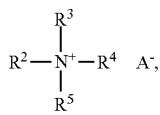

wherein
  $R^2$ is benzyl or $C_{6-18}$-alkyl;
  $R^3$ is $C_{1-18}$-alkyl or $-[(CH_2)_2-O]_n R^6$ where n=1-20;
  $R^4$ and $R^5$ independently of one another are CI-Li-alkyl;
  $R^6$ is hydrogen or unsubstituted or substituted phenyl; and
  $A^-$ is a monovalent anion or one equivalent of a polyvalent anion of an inorganic or organic acid, wherein the quaternary ammonium compound comprises a didecyldimethyl ammonium compound, a dioctyldimethyl ammonium compound, a mixture of a didecyldimethyl ammonium compound and an alkyldimethylbenzyl ammonium compound, or a mixture of a dioctyldimethyl ammonium compound and an alkyldimethylbenzyl ammonium compound;
  b) a polyalkylenebiguanide;
  c) a solvent comprising an organic solvent; and
  d) at least one surfactant comprising an ethoxylated ester;
    wherein the quaternary ammonium compound is present in an effective amount of about 150 ppm up to about 400 ppm, the polyalkylenebiguanide is present in an amount of about 150 ppm up to about 550 ppm, and the at least one surfactant is present in an amount from 0.01 wt. % to 5 wt %, based upon the weight of the sanitizing/disinfecting composition, whereby the quaternary ammonium compound and the polyalkylenebiguanide provide the composition with a $Log_{10}$ kill rate greater than 5 against *Staphylococcus aureus*, *Salmonella enterica*, or *Pseudomonas aeruginosa*,
    wherein the $Log_{10}$ kill is measured using test method for Pre-Saturated Towelette for Hard-Surface Disinfection (Modified AOAC 961.0 2, AOAC Germicidal Spray Products as Disinfectants); and
  e) an alkyl polyglucoside comprising C8-C10 alkyl polyglucoside.

2. The composition according to claim 1, wherein the polyalkylenebiguanide comprises polyhexamethylene biguanide.

3. The composition according to claim 1, wherein the alkyldimethylbenzyl ammonium chloride defines a $R^3$ that comprises a C12 to C18 alkyl.

4. The composition according to claim 1, wherein the anions comprise halides, carbonates, bicarbonate, carboxylates, sulfonates, phosphates or a mixture thereof.

5. The composition according to claim 4, wherein the anion comprises a chloride, a carbonate, a bicarbonate or mixtures thereof.

6. The composition according to claim 1, wherein the solvent further comprises water.

7. The composition according to claim 1, further comprising one or more of the following: builder salts, dyes, or fragrances.

8. A wipe comprising a wipe substrate, wherein the wipe substrate is saturated with the composition according to claim 1.

9. The wipe according to claim 8, wherein the wipe substrate is selected from the group consisting of woven material, a nonwoven materials and laminates thereof.

10. The wipe according to claim 9, wherein the nonwoven material is selected from the group consisting of meltblown, coform, spunbond, airlaid, hydroentangled nonwovens, spunlace, bonded carded webs, and laminates thereof.

11. The wipe according to claim 8, wherein the substrate is a nonwoven substrate selected from the group consisting of meltblown, coform, spunbond, airlaid, hydroentangled nonwovens, spunlace, bonded carded webs, and laminates thereof.

12. The wipe according to claim 11, further comprising one or more surfactants, builder salts, dyes, or fragrances.

13. A method of sanitizing or disinfecting a substrate comprising contacting a substrate with the composition according to claim 1 and allowing the composition to dry on the substrate.

14. The method according to claim 13, wherein the composition is impregnated into a wipe and the wipes applies the composition onto the substrate.

15. The composition according to claim 1, wherein the quaternary ammonium compound is present in an amount of about 300 ppm up to 400 ppm and the polyalkylenebiguanide is present in an amount of about 380 ppm up to 550 ppm.

16. The wipe according to claim 8, wherein the quaternary ammonium compound is present in an amount of about 300 ppm up to 400 ppm and the polyalkylenebiguanide is present in an amount of about 380 ppm up to 550 ppm.

17. The composition according to claim 1, wherein the composition dried on a hard surface is food-surface contact safe.

18. The composition according to claim 1, wherein the composition further includes an alcohol ethoxylate, an amine oxide, a betamine, a polyoxyalkylene polymer, or an alkyl polyglyceride.

19. The composition according to claim 1, further comprising a chelator.

* * * * *